US007486417B2

(12) United States Patent
Baek

(10) Patent No.: US 7,486,417 B2
(45) Date of Patent: Feb. 3, 2009

(54) APPARATUS FOR DRIVING LIQUID CRYSTAL DISPLAY DEVICE AND DRIVING METHOD USING THE SAME

(75) Inventor: Heume Il Baek, Anyang-shi (KR)

(73) Assignee: LG. Display Co., Ltd., Seoul (KR)

( * ) Notice: Subject to any disclaimer, the term of this patent is extended or adjusted under 35 U.S.C. 154(b) by 588 days.

(21) Appl. No.: 11/315,020

(22) Filed: Dec. 22, 2005

(65) Prior Publication Data

US 2006/0284805 A1 Dec. 21, 2006

(30) Foreign Application Priority Data

Jun. 20, 2005 (KR) ...................... 10-2005-0052906

(51) Int. Cl.
*G06F 15/00* (2006.01)
*G06K 1/00* (2006.01)
*H04N 1/60* (2006.01)
*G09G 5/02* (2006.01)

(52) U.S. Cl. ........................................ 358/1.9; 345/600

(58) Field of Classification Search .................. 358/1.9, 358/1.13, 504, 515, 516, 517, 518, 519, 523; 345/600, 581, 589, 590, 591, 593, 597, 598, 345/599

See application file for complete search history.

(56) References Cited

U.S. PATENT DOCUMENTS 7,227,543 B2 * 6/2007 Aoki et al. .................. 345/204
7,265,795 B2 * 9/2007 Ohyama et al. ............. 348/675

* cited by examiner

*Primary Examiner*—Douglas Q Tran
(74) *Attorney, Agent, or Firm*—Brinks Hofer Gilson & Lione

(57) ABSTRACT

An apparatus for driving a liquid crystal display, which is capable of controlling image brightness according to an Average Picture Level (APL) in a red-green-blue-white (RGBW) type display, and a driving method using the same is disclosed. The apparatus for driving a liquid crystal display device includes: a liquid crystal panel including 4-color sub-pixels; a data driver for providing video data signals to each sub-pixel; a gate driver for providing a scan pulse to each sub-pixel A data converter determines an Average Picture Level (APL) of 3-color source data, and generates a gain value corresponding to the average picture level. The 3-color source data is converted into 4-color data using the generated gain value; and a timing controller for communicates the 4-color data received through the data converter to the data driver.

94 Claims, 11 Drawing Sheets

APPARATUS FOR DRIVING LIQUID CRYSTAL DISPLAY DEVICE AND DRIVING METHOD USING THE SAME

This application claims the benefit of Korean patent application No. P2005-52906, filed on Jun. 20, 2005, which is hereby incorporated by reference as if fully set forth herein.

TECHNICAL FIELD

The present application relates to a Liquid Crystal Display (LCD) device, and more particularly to an apparatus for driving a liquid crystal display device, which is capable of controlling image brightness according to an Average Picture Level (APL) in a red-green-blue-white-type (RGBW) display, and a driving method using the same.

BACKGROUND

Various flat-panel displays are being developed to overcome defects of a Cathode Ray Tube (CRT) display, such as high weight and volume. Flat-panel displays include a Liquid Crystal Display (LCD), a Field Emission Display, a Plasma Display Panel (PDP) and a Light Emitting Display (LED).

Among the flat-panel displays, the LCD includes a TFT (Thin Film Transistor) substrate, color filter substrate and a liquid crystal layer. A plurality of liquid crystal cells which are arranged in an area defined by a plurality of data lines and a plurality of gate lines are formed on the TFT substrate. In addition, a TFT as a switch device is formed in each liquid crystal cell, and color filters are formed on the color filter substrates. The liquid crystal layer is formed between the TFT substrate and the color filter substrate.

The liquid crystal display device generates an electric field corresponding to data signals, and reproduces images by controlling the transmissivity of the liquid crystal layer. Herein, polarity of a data signal is reversed for each frame, for each column or for each dot in order to prevent a degradation which occurs by applying an electric field to the liquid crystal in a direction for a long time.

The liquid crystal display device forms a color image by mixing red light, green light and blue light provided from 3-color dots of red (R), green (G) and blue (B). However, in a general liquid crystal display device for displaying one sub-pixel using 3-color dots of red (R), green (G) and blue (B), light efficiency is deteriorated. Since color filter arranged in each sub-pixel of red (R), green (G) and blue (B) is penetrated about ⅓ of incident light, light efficiency is reduced.

In order to maintain the color realization ratio and to improve the light efficiency in the LCD device, Korean patent publication No. P2002-13830 (LCD device) and Korean patent publication No. P2004-83786 (Apparatus for driving of display device and method for driving thereof) discloses an RGBW type LCD device which includes a white color filter W as well as red, green and blue color filters.

FIG. 1 is a graph showing white brightness of each display device according to an average picture level displayed.

In a case of a small size cathode ray tube or a plasma display panel as a self-emitting type display device, when an average picture level is high as line 'A', the white brightness is low, whereas when the average picture level is low, the white brightness is high. On the other hand, in a case of a cathode ray tube above 30-inch diagonal size, when the average picture level is high as line 'B', the white brightness is low, whereas when the average picture level is low, the white brightness is high.

In addition, in a case of the liquid crystal display as a non-emissive display, since brightness is determined according to brightness of a backlight unit and transmissivity of liquid crystal, variation of brightness according to the average picture level does not occur. A RGBW type liquid crystal display for a television has high brightness as a line 'C' due to a white pixel. On the contrary, a RGB type liquid crystal display for a television has low brightness as a line 'D' in comparison to the RGBW type liquid crystal display. In addition, in a case of a RGB type liquid crystal display for a computer monitor, since it is a small size, the white brightness is as a line 'E'.

Since the RGBW type liquid crystal display device can acquire high white brightness using the same backlight, in comparison to a general RGB type liquid crystal display device, it is capable of acquiring white brightness as high as that of a cathode ray tube by enlarging a dynamic range with respect to the white brightness.

However, when the width ratio of white pixels is high, the conventional RGBW type liquid crystal display device causes eye strain of a user due to excessively high white brightness. Particularly, when the RGBW type liquid crystal display device is used as a multi-function monitor serving as both a television and a monitor, since most of word-processing or internet-access environment adopts a white image as a background, it causes user eye strain.

SUMMARY

An apparatus for driving a liquid crystal display device and a driving method using the same is provided, wherein, by controlling white brightness of an image according to an average picture level in an RGBW type display device, the display is capable of naturally displaying the image.

In another aspect, an apparatus for driving a liquid crystal display device and a driving method using the same is described, wherein, by controlling white brightness of an image according to an average picture level and a chromatic color/achromatic color ratio of input data in an RGBW type display device, the display is capable of naturally displaying the image.

An apparatus for driving a liquid crystal display (LCD) device may include: a liquid crystal panel including 4-color sub-pixels; a data driver for providing video data signals to each sub-pixel; a gate driver for providing a scan pulse to each sub-pixel; a data converter for detecting an Average Picture Level (APL) of 3-color source data inputted from outside, generating a value, such as a gain value, corresponding to the average picture level, and converting the 3-color source data into 4-color data using the generated value; and a timing controller for providing the 4-color data received through the data converter to the data driver, and controlling the gate driver and the data driver.

In another aspect, an apparatus for driving a liquid crystal display (LCD) device may include: a liquid crystal panel including 4-color sub-pixels; a data driver for providing video data signals to each sub-pixel; a gate driver for providing a scan pulse to each sub-pixel; a data converter for detecting an Average Picture Level (APL) of 3-color source data and a ratio of an achromatic color signal to a chromatic color signal inputted from outside, generating a value, such as a gain value, corresponding to the average picture level and the ratio, and converting the 3-color source data into 4-color data using the generated value; and a timing controller for providing the 4-color data received through the data converter to the data driver, and controlling the gate driver and the data driver.

In yet another aspect, a method for controlling a liquid crystal display (LCD) device which comprises a liquid crystal panel including 4-color sub-pixels, a data driver for providing video data signals to the sub-pixels, and a gate driver for providing a scan pulse to the sub-pixels, comprising: detecting an Average Picture Level (APL) of 3-color source data inputted from outside, and generating a value, such as a gain value, corresponding to the average picture level; converting the 3-color source data into 4-color data using the generated value; generating the scan pulse; and converting the 4-color data into the video data, and providing video data to each sub-pixel in synchronization with the scan pulse.

In still another aspect, a method for controlling a liquid crystal display (LCD) device which comprises a liquid crystal panel including 4-color sub-pixels, a data driver for providing video data signals to each sub-pixels, and a gate driver for providing a scan pulse to each sub-pixels, comprising: detecting an Average Picture Level (APL) of 3-color source data and a ratio of an achromatic color signal to a chromatic color signal, and generating a value, such as a gain value, corresponding to the average picture level; converting the 3-color source data into 4-color data using the generated value; generating the scan pulse; and converting the 4-color data into video data, and providing the video data to each sub-pixel in synchronization with the scan pulse.

DETAILED DESCRIPTION

Reference will now be made in detail to examples which are illustrated in the accompanying drawings. Wherever possible, the same reference numbers will be used throughout the drawings to refer to the same or like parts.

The apparatus and method for driving a liquid crystal display device according to a first example linearizes the 3-color source data (RGB) by reverse gamma correcting the 3-color source data (RGB) inputted from outside, detects the average picture level (APL) from the linearized 3-color source data (RGB), and generates the gain value (G) corresponding to the 3-color source data (RGB). Then, the apparatus and method generates the 3-color amplification data (Ra, Ga, Ba) by multiplying the 3-color source data (RGB) by the generated gain value (G), and abstracts the white data (Wb) from the common component of the 3-color amplification data (Ra, Ga, Ba). Subsequently, the apparatus and method generates the 3-color output data (Rb, Gb, Bb) by subtracting the abstracted white data (Wb) from the 3-color amplification data (Ra, Ga, Ba), generates the resulting 4-color output data (Ro, Go, Bo, Wo) by gamma-correcting the generated 3-color output data (Rb, Gb, Bb) and white data (Wb), and displays the resulting 4-color output data (Ro, Go, Bo, Wo) on the liquid crystal panel 102.

Figure 1:
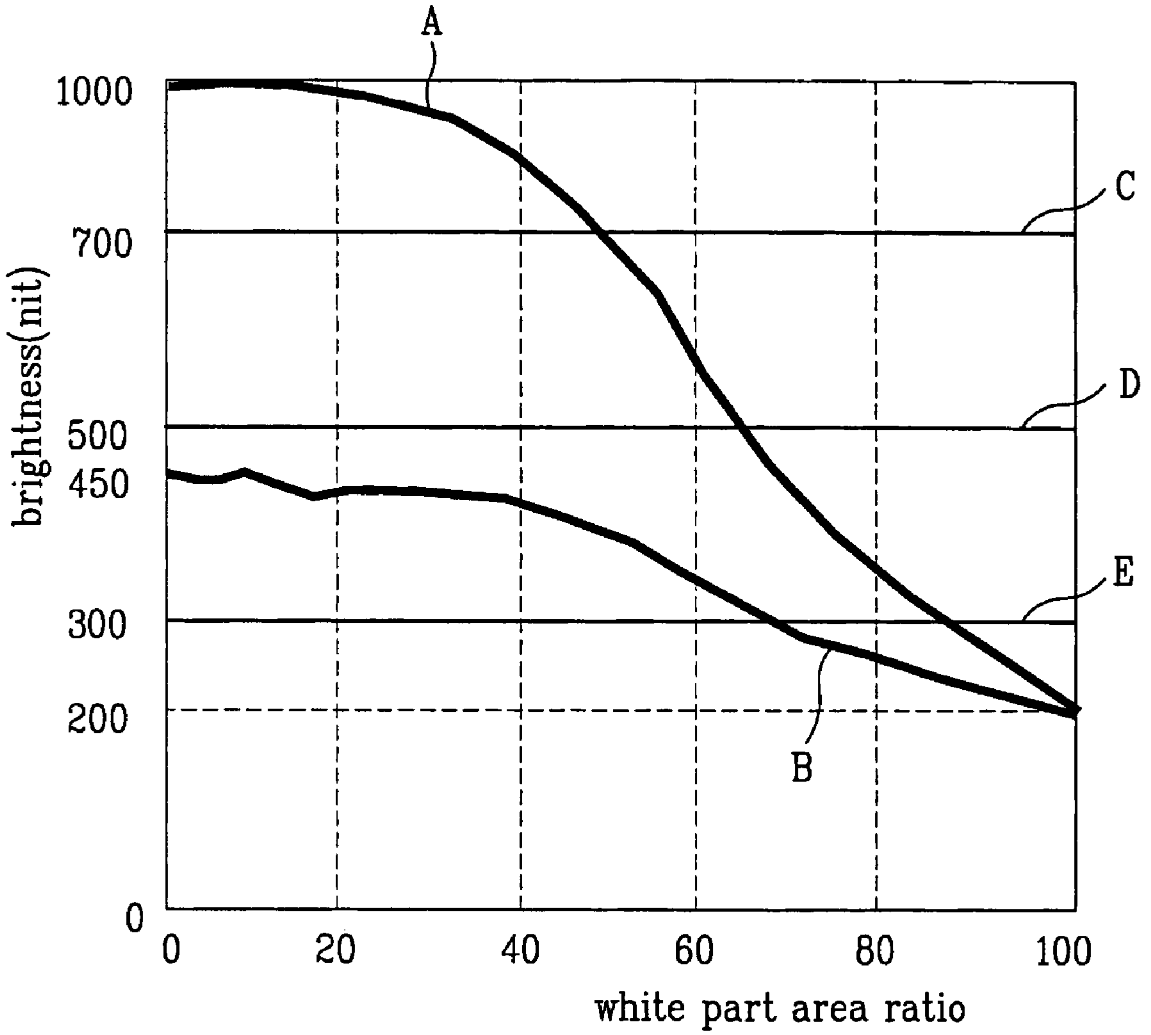
FIG. 1 is a graph showing white brightness of each display device according to an average picture level displayed on an image display part.
Figure 2:
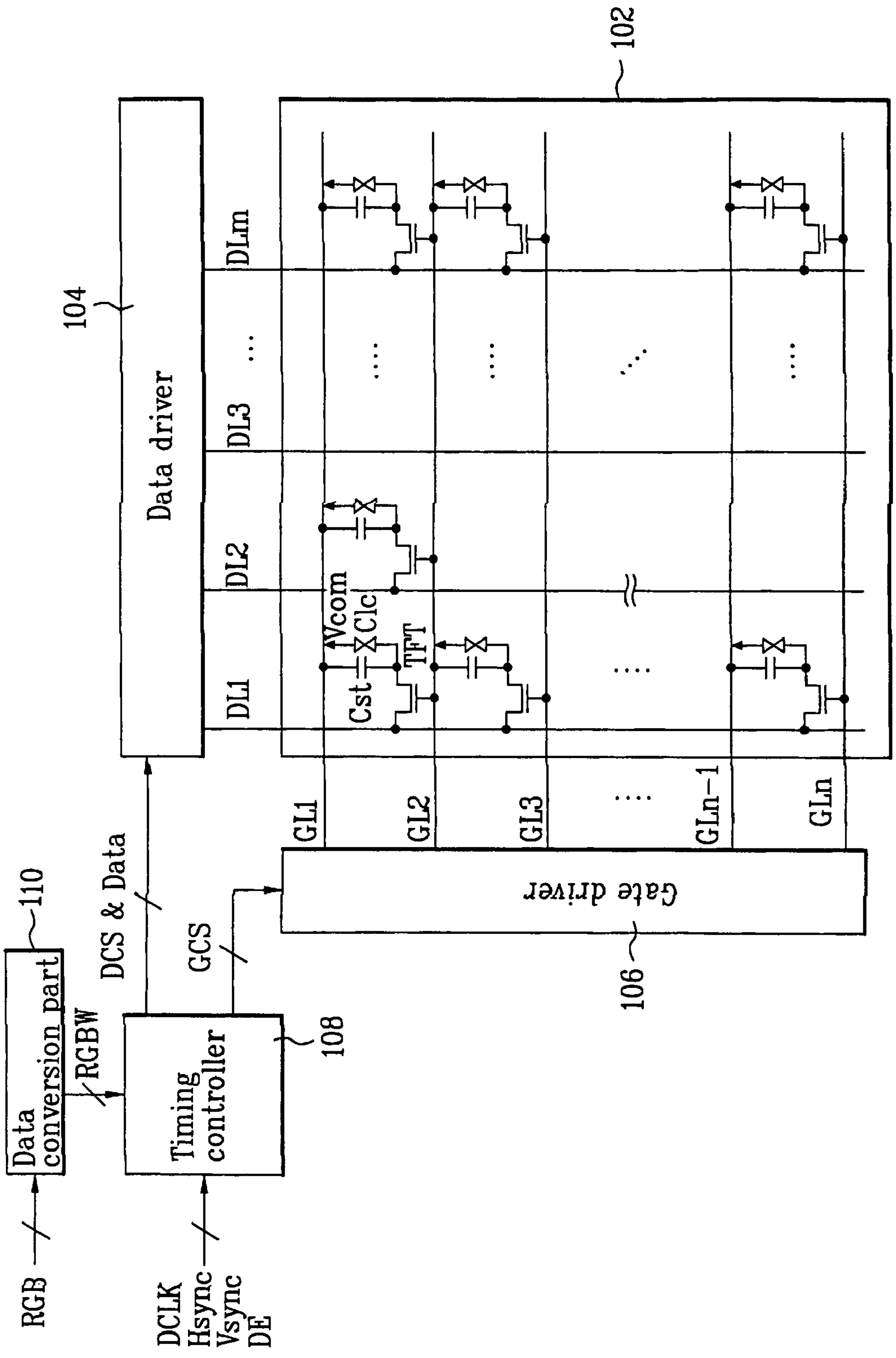
FIG. 2 is a block diagram showing the configuration of an apparatus for driving a liquid crystal display device n.

The driving apparatus of the liquid crystal display device shown in FIG. 2 includes: a liquid crystal panel 102 including a liquid crystal cells in which each 4-color sub-pixel area is defined by n gate lines (GL1 to GLn) and m data lines (DL1 to DLm); a data driver 104 for providing video data signals to the data lines (DL1 to DLm); a gate driver 106 for providing a scan pulse to the gate lines (GL1 to GLn); a data converter 110 for converting 3-color source data (RGB) into 4-color data (RGBW) according to an average picture level (APL) of the 3-color source data (RGB); and a timing controller 108 for arranging the 4-color data (RGBW) which are converted through the data converter 110, providing the arranged 4-color data (RGBW) to the data driver 104, controlling the data driver 104 by generating a data control signal (DCS), and controlling the gate driver 106 by generating a gate control signal (GCS).

The liquid crystal panel 102 includes a thin film transistor (TFT) which is formed in the area defined by the n gate lines (GL1 to GLn) and the m data lines (DL1 to DLm), and the liquid crystal cell which is connected to the thin film transistor. The thin film transistor (TFT) responds to the scan pulse inputted through the gate lines (GL1 to GLn), and provides the video data signal inputted through the m data lines (DL1 to DLm) to the liquid crystal cell. Since the liquid crystal cell is composed of a common electrode and a sub-pixel electrode located parallel to each other, the liquid crystal cell can be equivalently represented as a liquid crystal capacitor (Clc). The liquid crystal cell also includes a storage capacitor (Cst) connected to the previous gate line so as to remain a present data signal which is charged in the liquid crystal capacitor (Clc) until the next data signal is charged.

The liquid crystal panel 102 also includes red (R), green (G), blue (B) and white (W) sub-pixels which are repeatedly formed in a column direction of the sub-pixels. Each red (R), green (G) and blue (B) sub-pixel employs a corresponding color filter, whereas the white (W) sub-pixel does not employ a color filter. In addition, the red (R), green (G), blue (B) and white (W) sub-pixels may form a stripe structure of the same width ratio or different size ratio. In an aspect, the red (R), green (G), blue (B) and white (W) sub-pixels may be arranged in a quad, that is, a 2×2 matrix.

The data converter 110 detects the average picture level of the 3-color source data (RGB), and generates a gain value (G) for varying white brightness according to the average picture level. In addition, the data converter 110 amplifies the 3-color source data (RGB) according to the generated gain value (G), converts the 3-color source data (RGB) to 4-color data (RGBW) using white (W) data abstracted by a common component of the amplified 3-color source data (RGB), and provides the 4-color data (RGBW) to the timing controller 108.

The timing controller 108 arranges the 4-color data (RGBW) provided through the data converter 110 to be suitable for driving the liquid crystal panel 102, and provides the arranged 4-color date RGBW to the data driver 104. In addition, the timing controller 108 generates the data control signal (DCS) and a gate control signal (GCS) using a main clock (DCLK), a data enable signal (DE), and horizontal and vertical synchronization signals (Hsync, Vsync), and then controls drive timing of each data driver 104 and gate driver 106.

The gate driver 106 includes a shift register, wherein the shift register sequentially generates the scan pulses, that is, gate high pulses in response to a gate start pulse GSP and a gate shift clock GSC among the gate control signals GCS outputted from the timing controller 108. The thin film transistor (TFT) is turned-on in response to the scan pulse.

The data driver 104 converts the 4-color data (Data) arranged through the timing controller 108 according to the data control signal (DCS) provided from the timing controller 108, into a video data signal which is an analog signal, and provides the video data signal to the data lines (DL1 to DLm), wherein the video data signal corresponds to one horizontal line with respect to each 1 horizontal period at which the scan pulse is provided to the gate lines (GL1 to GLn). That is, the data driver 104 selects a gamma voltage with a predetermined level according to a gray-scale value of the 4-color data (Data), and applies the selected gamma voltage to data lines (DL1 to DLm)

Figure 3:
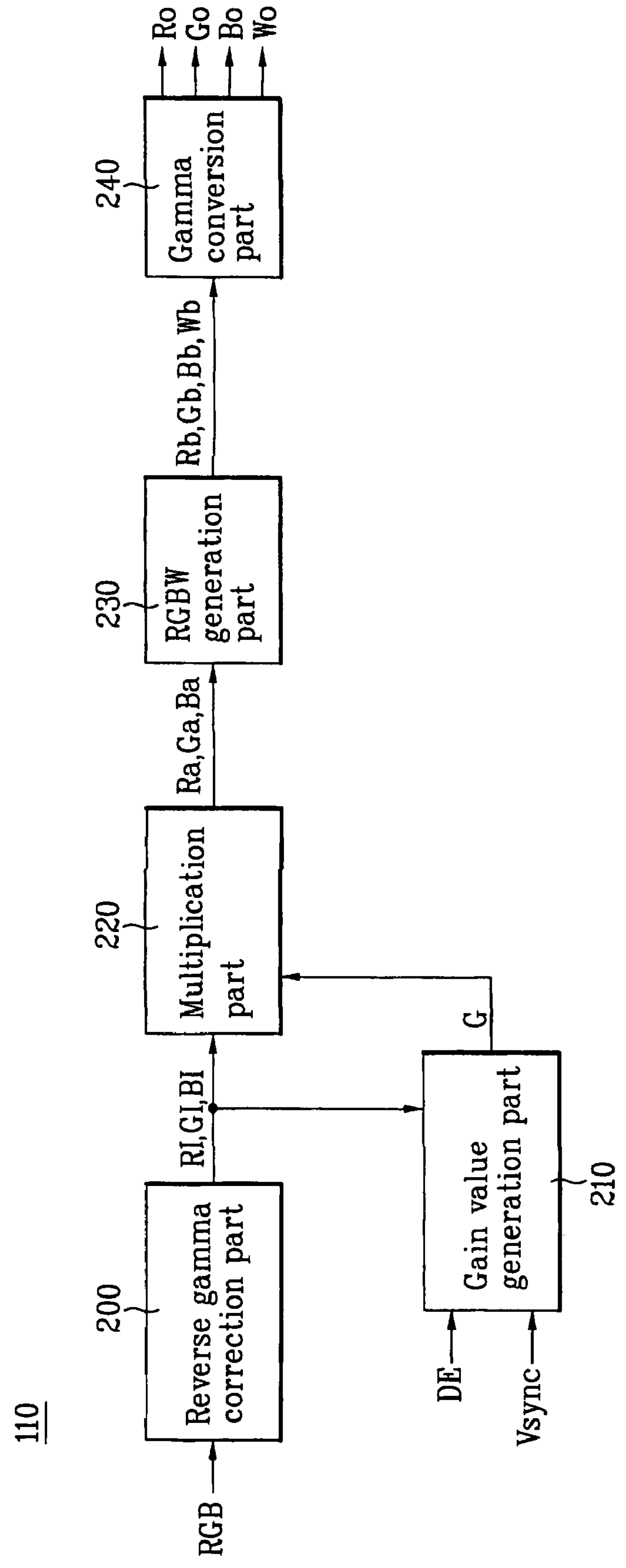
FIG. 3 is a block diagram illustrating the configuration of a data converter in FIG. 2 according to a first example.

The data converter 110 shown in FIG. 3 includes a reverse gamma correction part 200, a gain value generation part 210, a multiplication part 220, an RGBW generation part 230, and a gamma correction part 240.

The reverse gamma correction part 200 converts the 3-color source data (RGB) into a linearized 3-color input data (RI, GI, BI) using equation 1 because the 3-color source data (RGB) are gamma-corrected signals to compensate for an output characteristic of a cathode ray tube.

$$RI=R^{\lambda}$$

$$GI=G^{\lambda} \tag{1}$$

$$BI=B^{\lambda}$$

In this example, the gain value generation part 210 detects an average picture level (APL) of the 3-color input data (RI, GI, BI) outputted from the reverse gamma correction part 200, and then generates a gain value (G) for varying white brightness using the average picture level (APL).

Figure 4:
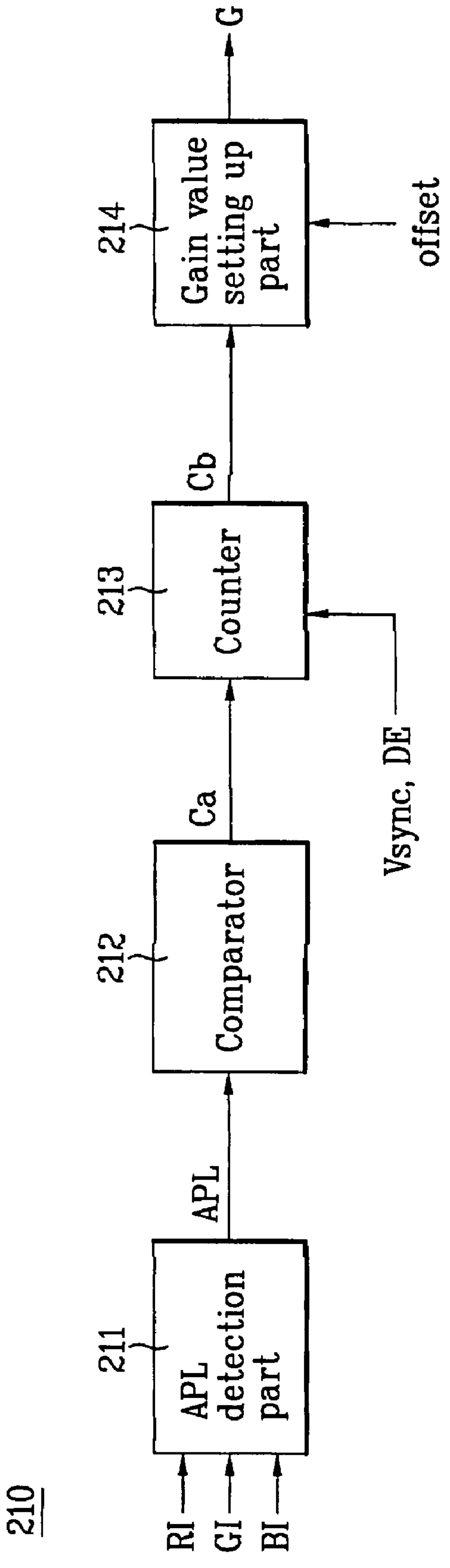
FIG. 4 is a block diagram illustrating the configuration of a gain value generation part in FIG. 3.

For this, as shown in FIG. 4, the gain value generation 210 includes an average picture level detection part 211, a comparator 212, a counter 213 and a gain value setting up part 214.

The average picture level detection part 211 detects average brightness, that is, the average picture level (APL) in a unit frame with respect to the 3-color input data (RI, GI, BI) according to equation 2.

$$APL=0.33R+0.34G+0.35B \tag{2}$$

The comparator 212 compares the average picture level (APL) provided from the average picture level detection part 211 with a predetermined threshold value, and generates a comparison result signal (Ca). The threshold value for determining light and darkness of an image corresponding to the 3-color input data (RI, GI, BI) may be set on the basis of overall image brightness, and is may be set to a range of approximately 0.5 to approximately 0.6. When the average picture level (APL) is below the threshold value, the comparator 212 outputs the comparison result signal (Ca) with a logical value of '1', and, otherwise, the comparator 212 outputs the comparison result signal (Ca) with a logical value of '0'.

The counter 213 counts the comparison result signal a logical value of '1' provided through the comparator 212 during one frame according to the data enable signal (DE) and the vertical synchronization signal (Vsync), and generates a count signal (Cb). The counter 213 is reset in a unit frame according to the vertical synchronization signal (Vsync).

Figure 5:
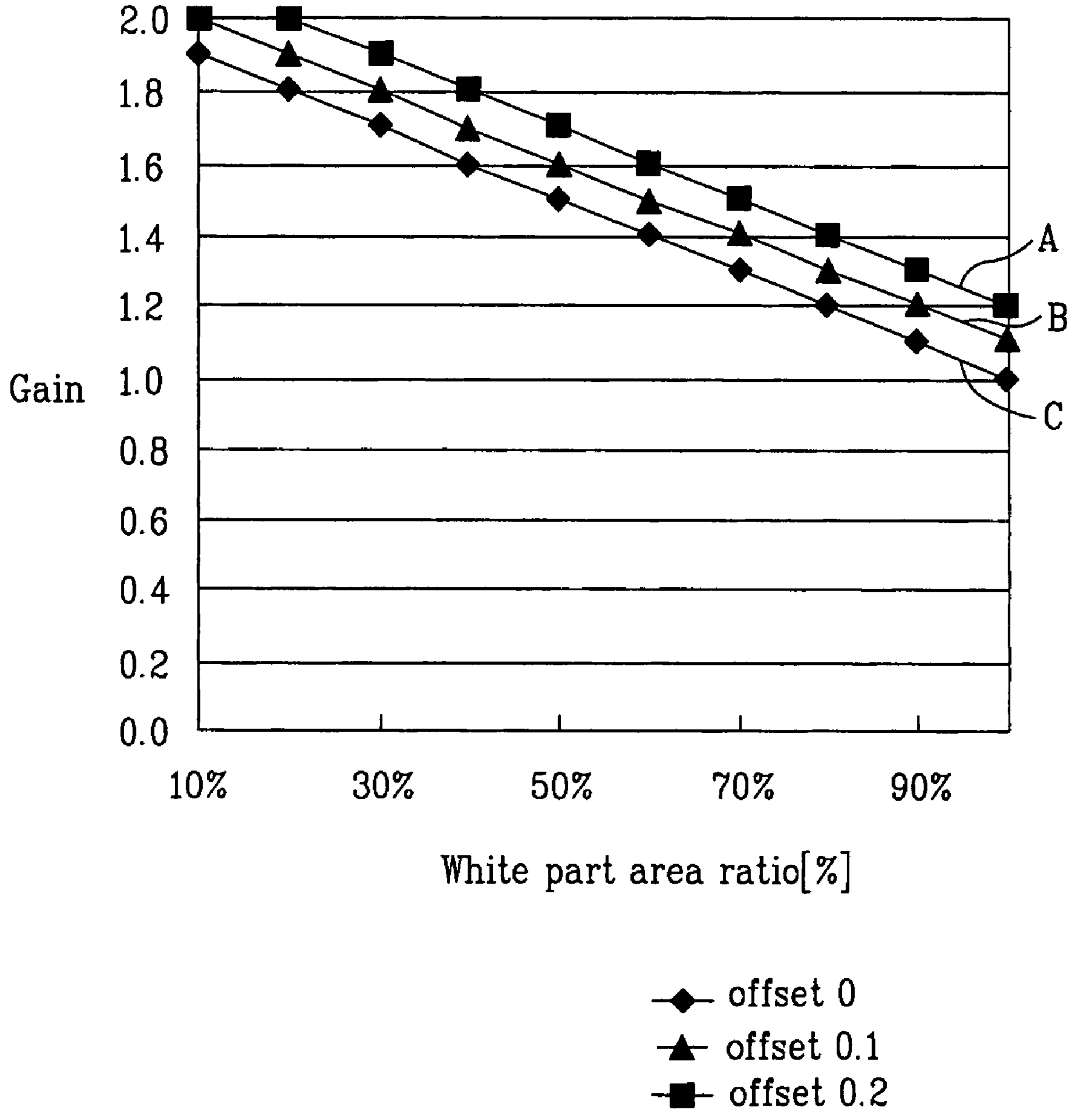
FIG. 5 is a graph showing a gain value with respect to a white part area ratio of an image displayed on a liquid crystal panel in FIG. 2.

The gain value setting up part 214 sets the gain value (G) using the count signal (Cb) provided from the counter 213 and an offset value (offset) as shown in equation 3, and provides the gain value (G) to the multiplication part 220 in FIG. 3. As shown in FIG. 5, the offset value (offset) for selecting the average picture level (APL) in which the white brightness with respect to the 3-color input data (RI, GI, BI) is saturated may be set on the basis of overall brightness image, and is preferably set to a range of approximately 0.2 to approximately 0.3. FIG. 5 is a graph showing a gain value with respect to a white part area ratio of an image displayed on a liquid crystal panel in FIG. 2.

$$G=1+\alpha\left(\frac{Cb}{Tpixel}\right)+\text{offset} \tag{3}$$

In the equation 3, $\alpha$ represents a minimum value of $\alpha_R$, $\alpha_G$ and $\alpha_B$ as parameters representing a relative size that white (W) sub-pixel contributes to brightness of the red (R), Green (G) and Blue (B) pixels in an RGBW display device, and $T_{pixel}$ represents the total number of pixels of the liquid crystal panel 102. Thus, the gain value (G) has a range of approximately (1+offset) to approximately (1+$\alpha$). At this time, the gain value setting up part 214 sets the gain value (G) to (1+$\alpha$) when the gain value (G) exceeds (1+$\alpha$).

On the other hand, the gain value setting part 214 may set a non-linearized gain value using an exponential function k as shown in equation 4.

$$G=1+\alpha\left(\left(\frac{Cb}{Tpixel}\right)^{k}+\text{offset}\right) \tag{4}$$

The multiplication part 220 generates 3-color amplification data (Ra, Ga, Ba) by multiplying the 3-color input data (RI, GI, BI) provided through the reverse gamma correction part 200 by the gain value (G) provided through the gain value generation part 210 as shown in equation 5, and provides the 3-color amplification data (Ra, Ga, Ba) to the RGBW generation part 230.

$$Ra=G\times RI$$

$$Ga=G\times GI \tag{5}$$

$$Ba=G\times BI$$

Figure 6:
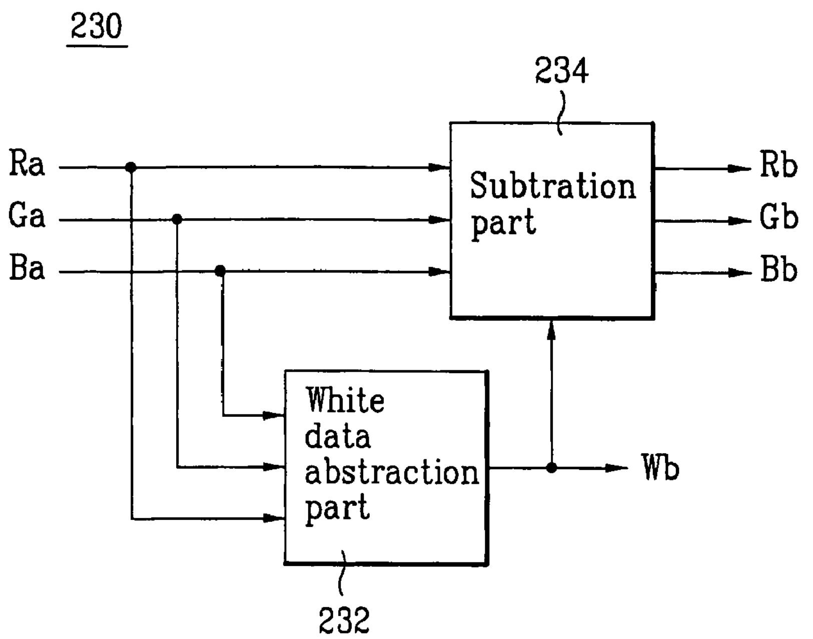
FIG. 6 is a block diagram illustrating the configuration of an RGBW generation part in FIG. 3.

The RGBW generation part 230 abstracts white data (Wb) from a common component of the 3-color amplification data (Ra, Ga, Ba) provided through the multiplication part 220, generates 4-color data (RGBW) using the abstracted white data (Wb) and provides the 4-color data (RGBW) to the gamma correction part 240. As shown in FIG. 6, the RGBW generation part 230 includes a white data abstraction part 232 and a subtraction part 234.

The white data abstraction part 232 abstracts the white data (Wb) from the common component of the 3-color amplification data (Ra, Ga, Ba) provided through the multiplication part 220 according to equation 6, and provides the white data (Wb) to the subtraction part 234.

$$Wb=Min(Da,\ 1) \qquad (6)$$

In equation 6, Da is Ra, Ga or Ba.

The white data abstraction part 232 abstracts the common component from a minimum value of 3-color amplification data (Ra, Ga, Ba) of red (R), green (G) and Blue (B), sets the common component to the white data (Wb), and outputs the white data (Wb). Herein, the white data (Wb) is less than or equal to 1.

The subtraction part 234 generates 3-color output data (Rb, Gb, Bb) by subtracting the white data (Wb) provided through the white data abstraction part 232 from the 3-color amplification data (Ra, Ga, Ba) provided through the multiplication part 220 as shown in equation 7, and provides the 3-color output data (Rb, Gb, Bb) to the gamma correction part 240. Simultaneously, the subtraction part 234 provides the white data (Wb) to the gamma correction part 240.

$$Rb=Ra-Wb$$

$$Gb=Ga-Wb \qquad (7)$$

$$Bb=Ba-Wb$$

Thus, the subtraction part 234 generates the 3-color output data (Rb, Gb, Bb) by subtracting the white data (Wb) which contribute to brightness of the red (R), Green (G) and Blue (B) pixels from the 3-color amplification data (Ra, Ga, Ba) so as to display accurate color in the Red (R), Green (G) and Blue (B) sub-pixels, and output the 3-color output data (Rb, Gb, Bb).

The gamma correction part 240 receives the 4-color output data (Rb, Gb, Bb, Wb) including the 3-color output data (Rb, Gb, Bb) and the white data (Wb) provided through the RGBW generation part 230, and generates the resulting 4-color output data (Ro, Go, Bo, Wo) by gamma-correcting the 4-color output data (Rb, Gb, Bb, Wb) according to equation 8.

$$Ro=(Rb)^{1/\lambda}$$

$$Go=(Gb)^{1/\lambda}$$

$$Bo=(Bb)^{1/\lambda} \qquad (8)$$

$$Wo=(Wb)^{1/\lambda}$$

The gamma correction part 240 generates the resulting 4-color output data (Ro, Go, Bo, Wo) which is adapted to a drive circuit of the liquid crystal panel 102 by gamma-correcting the 4-color output data (Rb, Gb, Bb, Wb) using a look-up table, and outputs the resulting 4-color output data (Ro, Go, Bo, Wo) to the timing controller 108.

Figure 7:
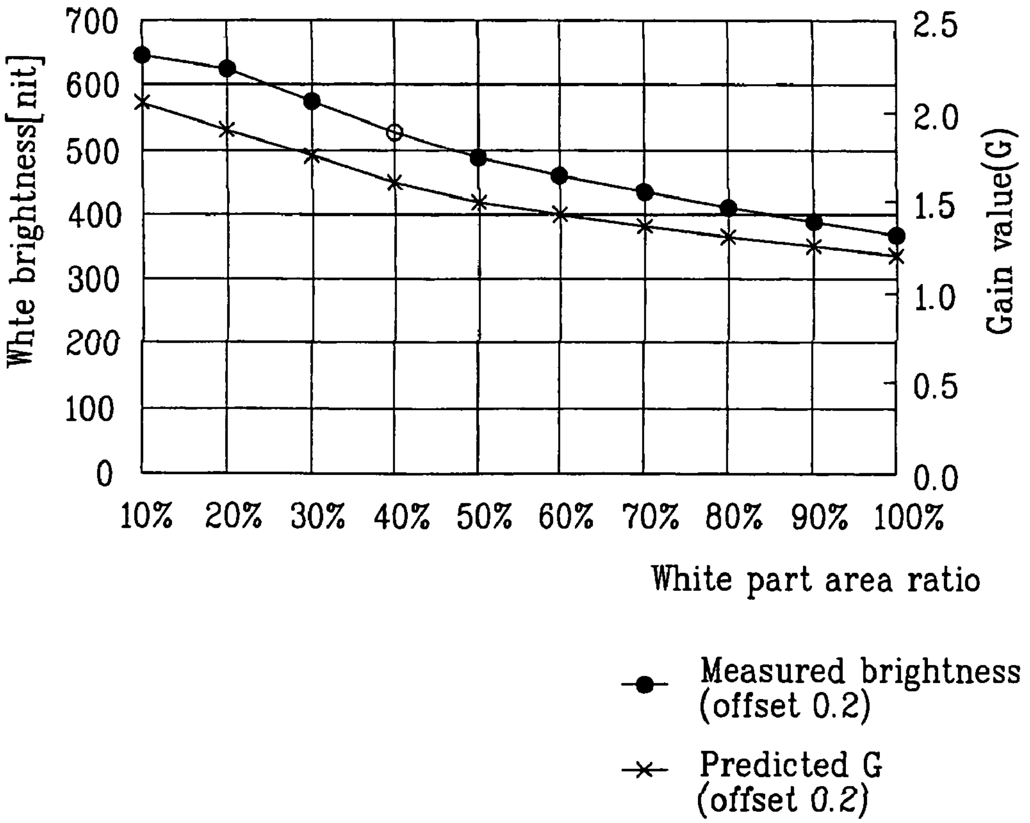
FIG. 7 is a graph showing a predicted gain value and a measured white brightness with respect to variation of an average picture level.

Thus, the apparatus for driving a liquid crystal display device and driving method in the first example may achieve high display quality, similar to that of a cathode ray tube, by controlling the white brightness of images according to the average picture level (APL) as shown in FIG. 7. Herein, FIG. 7 is a graph showing a predicted gain value and a measured white brightness with respect to variation of an average picture level. In addition, when using the apparatus for driving a liquid crystal display device and driving method using the same as a multi-function monitor serving as both a television and a monitor, it is possible to decrease user eye strain.

On the other hand, when an image with high-saturation/high-luminosity is displayed on the liquid crystal panel 102, display quality may degrade due to excessive increase of the gain value (G). This may occur when the average brightness of the input 3-color data (RGB) is below the threshold value of 0.5. Thus, by controlling the threshold value, it is possible to prevent the degradation in display-quality.

A second example the same structure as the first example as shown in FIG. 2, except for a data converter 110 for converting 3-color source data (RGB) into 4-color data (RGBW) according to a ratio of an achromatic color signal to a chromatic color signal and the average picture level (APL) of 3-color source data (RGB).

The data converter 110 has the same structure as in the first example as shown in FIG. 3, except for a gain value generation part 210 for generating the gain value (G) according to a ratio of an achromatic color signal to a chromatic color signal and according to the average picture level (APL) of 3-color input data (RI, GI, BI).

Figure 8:
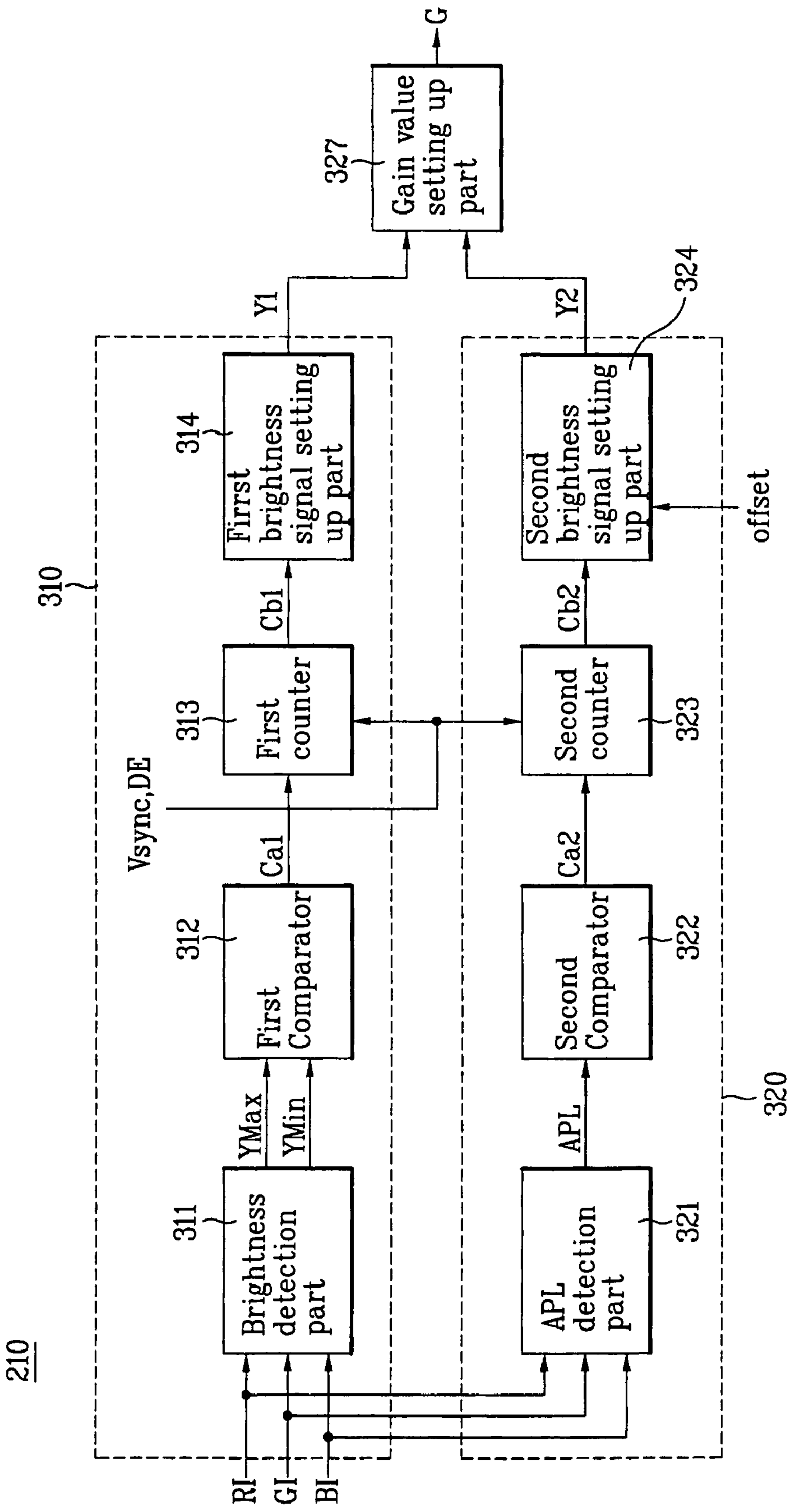
FIG. 8 is a block diagram illustrating the configuration of a gain value generation part of a data converter according to a second example.

FIG. 8 is a block diagram illustrating the configuration of a gain value generation part 210 of a data converter 110.

Referring to FIGS. 3 and 8, the gain value generation part 210 includes a first brightness signal generation part 310 for generating a first brightness signal (Y1) by analyzing, in a unit frame, the ratio of an achromatic color signal to a chromatic color signal of the 3-color input data (RI, GI, BI) inputted through the reverse gamma correction part 200; a second brightness signal generation part 330 for generating a second brightness signal (Y2) by detecting the average picture level (APL) of the 3-color input data (RI, GI, BI); and a gain value setting up part 327 for setting a gain value (G) according to the first and second brightness signals (Y1, Y2).

The first brightness signal generation part 310 includes a brightness detection part 311, a first comparator 312, a first counter 313 and a first brightness signal setting up part 314.

The brightness detection part 311 detects a maximum brightness value (Ymax) and a minimum brightness value (YMin) of the 3-color input data (RI, GI, BI) provided through the reverse gamma correction part 200. The brightness detection part 311 provides the detected maximum brightness value (Ymax) to the first comparator 312, and the right side of as shown in equation 9, provides the maximum brightness value (Ymax) calculated by multiplying the minimum brightness value (YMin) by a constant, C, to the first comparator 312. The constant, C, as a positive real number cannot be simply determined, and may be set empirically on the basis of gain values determined by evaluating various images.

$$Y\max=C\times Y\min \qquad (9)$$

The first comparator 312 compares the maximum brightness value (Ymax) and the minimum brightness value (YMin) provided through the brightness detection part 311, and outputs a first comparison result signal (Ca1). The first comparator 312 outputs the first comparison result signal (Ca1) with a low logical value '0' when the maximum brightness value (Ymax) exceeds the C-multiplied minimum brightness value as shown in equation 10, and, otherwise, outputs the first comparison result signal (Ca1) with a high logical value '1'.

$$Y\max\leqq C\times Y\min\text{--}\rightarrow\text{achromatic color signal}$$

$$Y\max>C\times Y\min\text{--}\rightarrow\text{chromatic color signal} \qquad (10)$$

The first counter 313 counts the first comparison result signal (Ca1) with a low logical value '0' provided through the first comparator 312 during a unit frame according to a data enable signal (DE) and a vertical synchronization signal (Vsync) provided from outside, and generates a first count signal (Cb1). At this time, the first counter 313 is reset in a unit frame according to the vertical synchronization signal (Vsync).

The first brightness signal setting up part 314 generates the first brightness signal (Y1) on the basis of first count signal (Cb1) provided through the first counter 313 as shown in equation 11, and provides the first brightness signal (Y1) to the gain value setting up part 327. The first brightness signal (Y1) has a range of approximately 0 to approximately 1.

$$Y1 = \left(\frac{Cb1}{Tpixel}\right) \tag{11}$$

In the equation 11, $T_{pixel}$ represents the total number of pixels of the liquid crystal panel 102.

Figure 9:
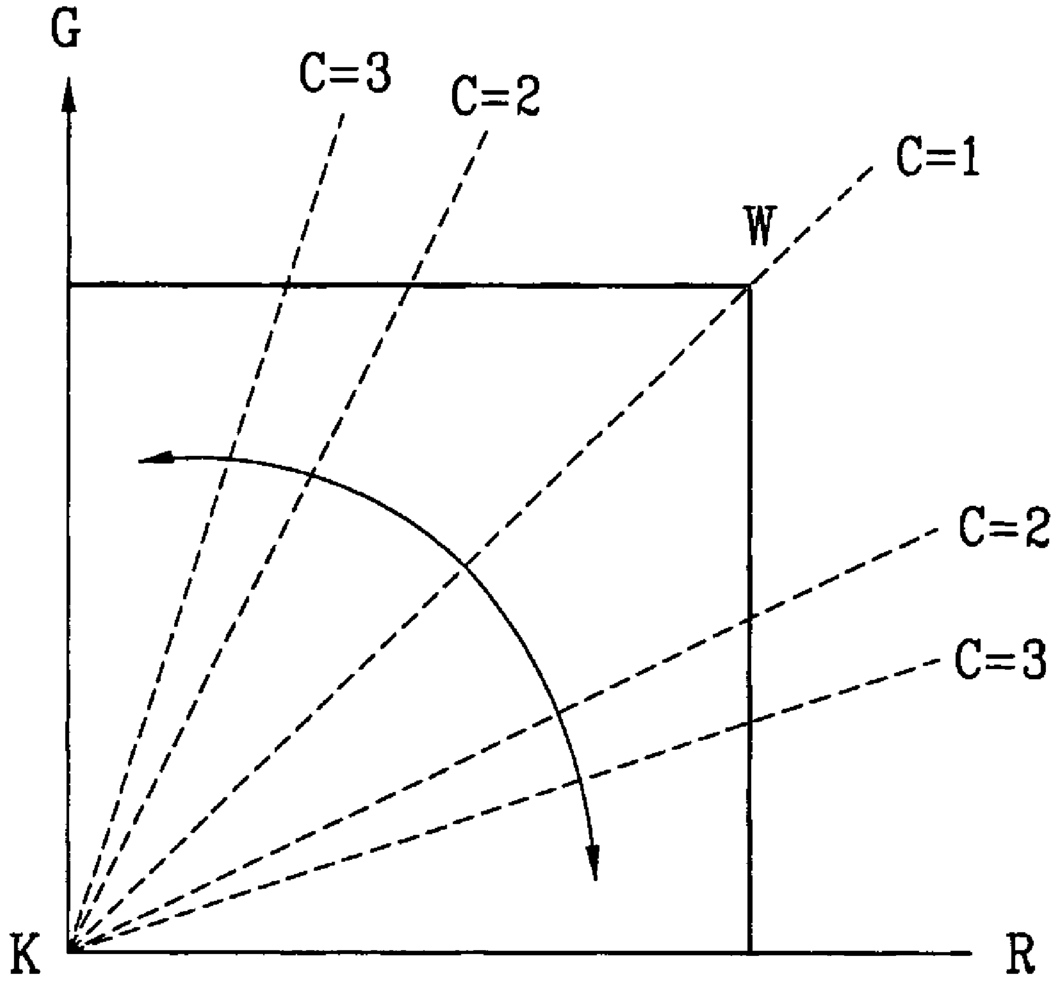
FIG. 9 is a view illustrating a determination criterion with respect to an achromatic color signal to a chromatic color signal in an RGB coordinate system.

The first signal brightness generation part 310 determines whether the 3-color input data (RI, GI, BI) is an achromatic color signal or a chromatic color signal using the above equations 9 and 10. A determination criterion of the achromatic color signal or the chromatic color signal with respect to the 3-color input data (RI, GI, BI) using the above equations 9 and 10 is as shown in FIG. 9. FIG. 9 is a view illustrating a determination criterion for differentiating an achromatic color signal from a chromatic color signal in an RGB coordinate system.

As shown in FIG. 9, on a line (C=1) that the maximum brightness value (Ymax) and the minimum brightness value (YMin) are the same, a black signal and a white signal are present. Therefore, in a case of pure red (R) or pure green (G), the minimum brightness value (YMin) is 0. When a constant, C, increases according to equation 9, the image is close to a chromatic color, whereas, when the constant, C, is '1', the image is an achromatic color. If signals in a unit frame are analyzed by setting a plurality of determination criteria, it is possible to more accurately analyze signals of corresponding frame. The constant, C, may be one of the determination criteria.

The first brightness signal generation part 310 sets the first brightness signal using equation 11. In an example where a resolution of the liquid crystal display device is XGA (extended Graphics Array) (1024*768), a total number of sub-pixels in one frame is 786,432. Thus, when counting any one of the achromatic color signal or the chromatic color signal using the first counter 313, the remainder is determined by subtracting the count from the total number of sub-pixels. This results in counting effective data in one frame using the vertical synchronization signal (Vsync) and the data enable signal (DE). The first brightness signal (Y1) corresponding to the frame must be produced using a frame memory, but a cost for the apparatus is increased due to the frame memory. However, as e there is little difference between preceding and succeeding images of to frame in a moving image, the first brightness signal (Y1) which is produced from the previous frame may be used instead.

The second brightness signal generation part 320 includes an average picture level detection part 321, a second comparator 322, a second counter 323 and a second brightness signal setting up part 324.

The average picture level detection part 321 detects the average brightness, that is, the average picture level (APL) in a unit frame with respect to the 3-color input data (RI, GI, BI) according to equation 2.

The second comparator 322 compares the average picture level (APL) provided from the average picture level detection part 321 with a threshold value, and generates a second comparison result signal (Ca2). The threshold value for determining light and darkness of an image corresponding to the 3-color input data (RI, GI, BI) may be set on the basis of overall brightness image, and is preferably set to a range of approximately 0.5 to approximately 0.6. When the average picture level (APL) is below the threshold value, the second comparator 322 outputs the second comparison result signal (Ca2) with a logical value of '1', and, otherwise, the second comparator 322 outputs the second comparison result signal (Ca2) with a logical value of '0'.

The second counter 323 counts the second comparison result signal (Ca2) a logical value of '1' provided through the second comparator 322 during one frame according to the data enable signal (DE) and the vertical synchronization signal (Vsync), and generates a second count signal (Cb2). The second counter 323 is reset in a unit frame by the vertical synchronization signal (Vsync).

The second brightness signal setting part 324 sets the second brightness signal (Y2) using the second count signal (Cb2) provided from the second counter 323 and an offset value (offset) as shown in equation 12, and provides the second brightness signal (Y2) to the gain value setting up part 327. As shown in FIG. 5, the offset value (offset) for selecting the average picture level (APL) in which the white brightness with respect to the 3-color input data (RI, GI, BI) is saturated, may be set on the basis of overall brightness image, and is may be set to a range of approximately 0.2 to approximately 0.3.

$$Y2 = \left(\frac{Cb2}{Tpixel}\right) + \text{offset} \tag{12}$$

In equation 12, $T_{pixel}$ represents the total number of pixels of the liquid crystal panel 102.

The second brightness signal (Y2) which is set through the second brightness signal setting up part 324 has a higher value corresponding to the average picture level (APL) when the 3-color input data (RI, GI, BI) are high saturation signals, and has a range of approximately 0 to approximately 1.

Thus, the gain value setting part 327 sets the gain value, G using the first and second brightness signals (Y1, Y2) as shown in equation 13. The gain value setting up part 327 sets the gain value (G) to (1+offset) when the gain value, G exceeds (1+offset).

$$G=1+\alpha(Y1\times Y2) \tag{13}$$

In equation 13, a represents a minimum value of $\alpha_R$, $\alpha_G$ and $\alpha_B$ as parameters representing a relative size that white (W) sub-pixel contributes to brightness of the red (R), Green (G) and Blue (B) pixels in an RGBW display device.

Figure 10A:
FIG. 10A is a photograph showing display-quality with respect to a conventional apparatus.

The gain value setting up part 327 restrains overall size of the gain value (G) by multiplying the first and second brightness signals (Y1, Y2) each other. For example, in a case of an image with high-saturation/high-luminosity as shown in FIG. 10A, since a size of the second brightness signal (Y2) is heightened according to the average picture level (APL), whereas a size of the first brightness signal (Y1) is lowered according to the ratio of the an achromatic color signal to a chromatic color signal, the gain value setting up part 327 can restrain an increase of the gain value (G). That is, when the 3-color input data (RI, GI, BI) are a black and white image, the first brightness signal (Y1) is 1 since the 3-color input data (RI, GI, BI) are all achromatic colors. Thus, the gain value setting up part 327 can control the white brightness by setting the gain value (G) according to the first brightness signal (Y1) with respect to the average picture level (APL). In addition, when the 3-color input data (RI, GI, BI) are an image with high-saturation/high-luminosity as shown in FIG. 10A, the second brightness signal (Y2) is approximately 1 since a threshold value of the average picture level (APL) is below 0.5. Thus, the gain value setting part 327 can control the white brightness by setting the gain value, G, according to the second brightness signal (Y2) with respect to the ratio of an achromatic color signal to a chromatic color signal.

Figure 10B:
FIG. 10B is a photograph showing display-quality with respect to an apparatus and method for driving a liquid crystal display device according to the first example.

FIG. 10A is a photograph showing display quality in a conventional apparatus, and FIG. 10B is a photograph showing display quality in an apparatus and method for driving a liquid crystal display device as described in the first example.

In another aspect, the gain value setting part 327 may set a non-linearized gain value using an exponential function k as shown in equation 14.

$$G=1+\alpha(Y1\times Y2)^k \tag{14}$$

Thus, even though an image with high-saturation/high-luminosity is displayed on the liquid crystal panel 102, the apparatus for driving a liquid crystal display device and driving method generates 4-color data (RGBW) including white data (W) by setting a gain value according to a ratio of an achromatic color signal to a chromatic color signal and the average picture level (APL) of 3-color source data (RGB), and then varies the white brightness, thereby displaying a high-saturation/high-luminosity image.

Figure 11:
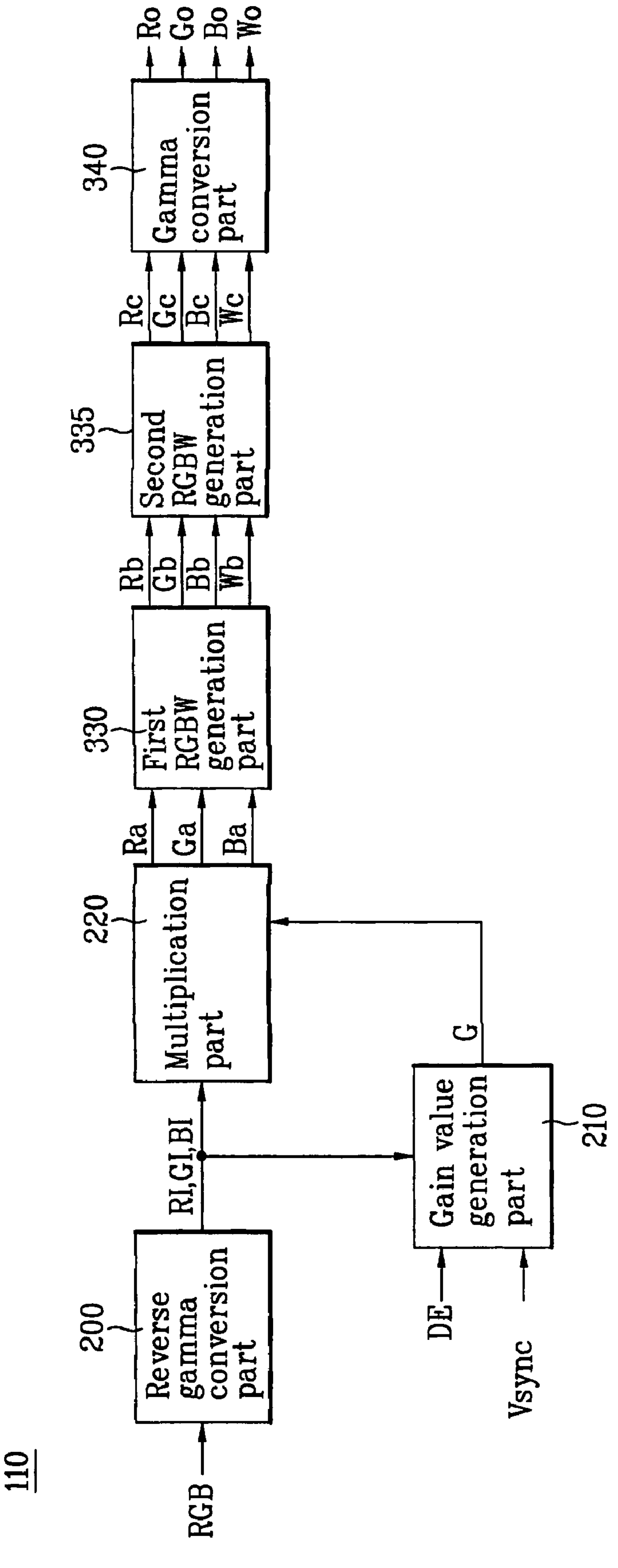
FIG. 11 is a block diagram illustrating the configuration of a data converter according to a third example.

Referring to FIGS. 2 and 11, the data converter 110 according to the third example includes a reverse gamma correction part 200, a gain value generation part 210, a multiplication part 220, a first RGBW generation part 330, a second RGBW generation part 335 and a gamma correction part 340.

Since the reverse gamma correction part 200, the gain value generation part 210 and the multiplication part 220 are the same structure as in the first and second examples, a detailed explanation of these elements is thus described with reference to FIGS. 3 and 4.

The first RGBW generation part 330 having the same structure and operation method as the RGBW generation part 230 as shown in FIG. 3 generates first output data (Rb, Gb, Bb, Wb) using the 3-color amplification data (Ra, Ga, Ba) provided through the multiplication part 220, and provides the first output data (Rb, Gb, Bb, Wb) to the second RGBW generation part 335.

The second RGBW generation part 335 is configured to generate second output data (Rc, Gc, Bc, Wc), and provides the second output data (Rc, Gc, Bc, Wc) to the gamma correction part 340 so that the first output data (Rb, Gb, Bb, Wb) may be more accurately displayed.

Figure 12:
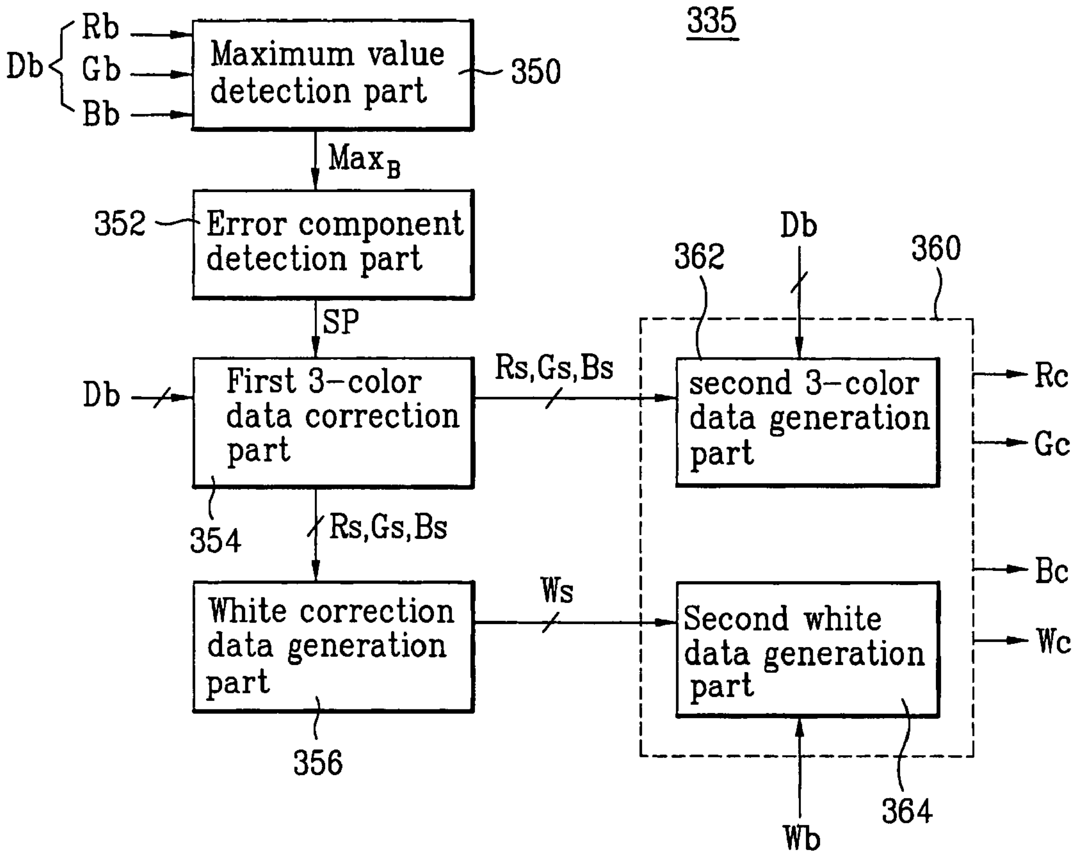
FIG. 12 is a block diagram illustrating the configuration of a second RGBW generation part in FIG. 12.

For this, as shown in FIG. 12, the second RGBW generation part 335 includes a maximum value detection part 350, an error component detection part 352, a first 3-color data correction part 354, a first white data correction part 356 and a second output data generation part 360.

The maximum value detection part 350 detects a maximum value ($Max_B$) from the first 3-color output data (Rb, Gb, Bb) except for the first white output data (Wb) among the first output data (Rb, Gb, Bb, Wb) provided through the first RGBW generation part 335 as shown in equation 15, and outputs the detected maximum value ($Max_B$).

$$Max_B=Max(D_B) \tag{15}$$

In equation 15, $D_B$ is Rb, Gb or Bb.

The error component detection part 352 detects an error component (SP) by subtracting 1 from the maximum value ($Max_B$) provided through the maximum value detection part 350 as shown in equation 16.

$$SP=Max_B-1 \tag{16}$$

In equation 16, $Max_B$ is greater than 1.

The first 3-color data correction part 354 corrects the first 3-color output data (Rb, Gb, Bb) using the error component (SP) and the maximum value ($Max_B$) as shown in equation 17.

$$Rs = SP\times\left(\frac{Rb}{\mathrm{Max}_B}\right) \quad Gs = SP\times\left(\frac{Gb}{\mathrm{Max}_B}\right) \quad Bs = SP\times\left(\frac{Bb}{\mathrm{Max}_B}\right) \tag{17}$$

The first 3-color data correction part 354 generates first red correction data (Rs) by multiplying the error component (SP) by a value which is the result of dividing the first red output data (Rb) by the maximum value ($Max_B$), and outputs the first red correction data (Rs). The first 3-color data correction part 354 generates first green correction data (Gs) by multiplying the error component (SP) by value which is the result of dividing the first green output data (Gb) by the maximum value ($Max_B$), and outputs the first green correction data (Rs). And, the first 3-color data correction part 354 generates first blue correction data (Bs) by multiplying the error component (SP) by a value which is the result of dividing first the blue output data (Bb) by the maximum value ($Max_B$), and outputs the first blue correction data (Bs).

The white correction data generation part 356 generates white correction data (Ws) on the basis of the first 3-color correction data (Rs, Gs, Bs) provided through the first 3-color data correction part 354 according to equation 18, and outputs the white correction data (Ws).

$$Ws=xRs+yGs+zBs \tag{18}$$

In equation 18, x, y and z are characteristic parameters for each red, green and blue, and may have the same value or differing values.

The white correction data generation part 356 generates the white correction data (Ws) by multiplying the first 3-color correction data (Rs, Gs, Bs) by each characteristic parameter, and then adding the multiplication result values each other.

The second output data generation part 360 includes a second 3-color data generation part 362 and a second white data generation part 364.

The second 3-color data generation part 362 generates second output data (Rc, Gc, Bc) on the basis of the first 3-color correction data (Rs, Gs, Bs) provided through the first 3-color data correction part 354, and the first 3-color output data (Rb, Gb, Bb) according to equation 19, and outputs the second output data (Rc, Gc, Bc) to the gamma correction part 340.

$$Rc=Rb-Rs \quad Gc=Gb-Gs \quad Bc=Bb-Bs \tag{19}$$

The second 3-color data generation part 362 generates second red output data (Rc) by subtracting the first red correction data (Rs) from the first red output data (Rb), and outputs the second red output data (Rc). The second 3-color data generation part 362 generates second green output data (Gc) by subtracting the first green correction data (Gs) from the first green output data (Gb), and outputs the second green output data (Gc). The second 3-color data generation part 362 generates second blue output data (Bc) by subtracting the first blue correction data (Bs) from the first blue output data (Bb), and outputs the second blue output data (Bc).

The second white data generation part 364 generates second white output data (Wc) by adding the first white output data (Wb) to the white correction data (Ws) provided through the white correction data generation part 356 according to equation 20, and outputs the second white output data (Wc) to the gamma correction part 340.

$$Wc=Wb+Ws \tag{20}$$

The gamma correction part 340 receives the second output data (Rc, Gc, Bc, Wc) including the second output data (Rc, Gc, Bc) and the second white output data (Wc) provided through the second output data generation part 360, gamma corrects the second output data (Rc, Gc, Bc, Wc) according to equation 21, and converts the gamma-corrected second output data (Rc, Gc, Bc, Wc) into the resulting 4-color output data (Ro, Go, Bo, Wo).

$$\begin{aligned} Ro&=(Rc)^{1/\lambda}\\ Go&=(Gc)^{1/\lambda}\\ Bo&=(Bc)^{1/\lambda}\\ Wo&=(Wc)^{1/\lambda} \end{aligned} \tag{21}$$

The gamma correction part 340 generates the resulting 4-color output data (Ro, Go, Bo, Wo) which are adapted to a drive circuit of the liquid crystal panel 102 by gamma correcting the second output data (Rc, Gc, Bc, Wc), which may be, for example, using a look-up table, and outputs the resulting 4-color output data (Ro, Go, Bo, Wo) to the timing controller 108.

Thus, when RGBW brightness deviates from a defined area, the data converter 110 according to the third example, may more accurately display images, by correcting the brightness via additional operations such as the above-describe equations 15 to 21.

The apparatus for driving a liquid crystal display device and a driving method using the same, controls the white brightness of an image according to an average picture level in an RGBW type display device, so that it is possible to naturally display the image. In addition, an apparatus for driving a liquid crystal display device and a driving method using the same, controls white brightness of an image according to an average picture level and a chromatic color/achromatic color ratio of input data in an RGBW type display device, so that it is possible to naturally display the image.

It may possible to produce a high display quality, similar to that of a cathode ray tube, and when used as a multi-function monitor serving as both a television and a monitor, it is possible to decrease user eye strain.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for driving a liquid crystal display (LCD) device comprising:

a liquid crystal panel;

a data driver communicating with pixels of the liquid crystal panel;

a gate driver;

a data converter configured to determine an Average Picture Level (APL) of 3-color source data, to generate a gain value proportional to the APL, and to convert the 3-color source data into 4-color data using the generated gain value; and a timing controller to communicate the 4-color data from the data converter to the data driver, and to control the gate driver and the data driver, wherein each pixel of the liquid crystal panel has 4 sub-pixels.

2. The apparatus as in claim 1, wherein the data converter comprises:

a reverse gamma correction part to reverse gamma correct the 3-color source data so as to generate 3-color input data;

a gain value generation part to generate a gain value corresponding to the APL of the 3-color input data;

a multiplication part to multiply the 3-color input data by the gain value so as to generate 3-color amplification data;

a first 4-color data generation part to abstract first white data from a common component of the 3-color amplification data, and to generate first 3-color output data using the first white data; and a gamma correction part that gamma to correct the first white data and the first 3-color output data so as to generate the 4-color data.

3. The apparatus as in claim 2, wherein the gain value generation part comprises:

an average picture level detection part to determine the APL of the 3-color input data;

a comparator to compare the APL with a threshold value, and to output a comparison result signal;

a counter to count the comparison result signal in a unit frame, and to generate a count signal; and a gain value setting part to set the gain value according to the count signal and an offset value.

4. The apparatus as in claim 3, wherein the threshold value is approximately 0.5 to approximately 0.6.

5. The apparatus as in claim 3, wherein the offset value is approximately 0.2 to approximately 0.3.

6. The apparatus as in claim 3, wherein the gain value setting part sets the gain value to a value of approximately (1+offset) to a value of approximately (1+$\alpha$), an $\alpha$ value being a positive real number.

7. The apparatus as in claim 6, wherein the gain value setting part divides the count signal by the number of pixels of the liquid crystal panel produces the $\alpha$ value by adding the offset value to the divided value, and sets the gain value by adding unity to the $\alpha$ value.

8. The apparatus as in claim 2, wherein the first 4color data generation part is configured to abstract the first white data from the common component of the 3-color amplification data, to generate the first 3-color output data by subtracting the abstracted first white data from the 3-color amplification data, and to output the generated first 3-color output data.

9. The apparatus as in claim 8, wherein the first 4-color data generation part multiplies the abstracted first white data by a 3-color $\alpha$ value such that the abstracted first white data contributes to brightness of the first 3color output data.

10. The apparatus as in claim 1, wherein the data converter further comprises:

a reverse gamma correction part to reverse gamma correct the 3-color source data so as to generate 3-color input data;

a gain value generation part to generate a gain value according to the average picture level of the 3-color input data;

a multiplication part multiply the 3-color input data by the gain value so as to generate 3-color amplification data;

a first 4-color data generation part to abstract first white data from a common component of the 3-color amplification data, and to generate first 3-color output data using the first white data;

a second 4-color data generation part to correct the first white data and the first 3-color output data, and to generate second white data and second 3-color output data; and a gamma correction part to gamma correct the second white data and the second 3-color output data so as to generate the 4-color data.

11. The apparatus as in claim 10, wherein the gain value generation part comprises:

a average picture level detection part to detect the average picture level of the 3-color input data;

a comparator to compare the average picture level with a threshold value, and to output a comparison result signal;

a counter to count the comparison result signal in a unit frame, and to generate a count signal; and a gain value setting part to set the gain value according to the count signal and an offset value.

12. The apparatus as in claim 11, wherein the threshold value is approximately 0.5 to approximately 0.6.

13. The apparatus as in claim 11, wherein the offset value is approximately 0.2 to approximately 0.3.

14. The apparatus as in claim 11, wherein the gain value setting part sets the gain value from approximately a value (1+offset) to approximately a value of $(1+\alpha)$, and an $\alpha$ value is a positive real number.

15. The apparatus as in claim 14, wherein the gain value setting part divides the count signal by the number of pixels of the liquid crystal panel, and produces the $\alpha$ value by adding the offset value to the divided value, and sets the gain value by adding unity to the $\alpha$ value.

16. The apparatus as in claim 10, wherein the first 4-color data generation part abstracts the first white data from the common component of the 3-color amplification data, generates the first 3-color output data by subtracting the abstracted first white data from the 3-color amplification data, and outputs the generated first 3-color output data.

17. The apparatus as in claim 16, wherein the first 4color data generation part multiplies the abstracted first white data by a 3-color $\alpha$ value such that the abstracted first white data contributes to brightness of the first 3-color output data.

18. The apparatus as in claim 10, wherein, the second 4-color data generation part comprises:

a maximum value detection part to determine a maximum brightness value of the first 3-color output data;

an error component detection part to determine an error component using the maximum brightness value;

a first 3-color data correction part to generate 3-color correction data using the first 3-color output data and the error component;

a white correction data generation part to generate white correction data using the 3-color correction data;

a second 3-color data generation part to generate second 3-color output data using the first 3-color output data and the 3-color correction data; and a second white data generation part to generate the second white data using the white correction data and the first white data.

19. The apparatus as in claim 18, wherein the error component detection part subtracts unity from the maximum brightness value.

20. The apparatus as in claim 18, wherein the first 3color data correction part generates the 3-color correction data by multiplying the error component by a division result value obtained by dividing the first 3-color output data by the maximum brightness value.

21. The apparatus as in claim 18, wherein the white correction data generation part multiplies each characteristic parameter of the 3-color data by the 3-color correction data to obtain a multiplication result value, and to generate the white correction data by adding each multiplication result value.

22. The apparatus as in claim 18, wherein the second 3color data generation part generates the second 3-color output data by subtracting the 3-color correction data from the first 3-color output data.

23. The apparatus as in claim 18, wherein the second white data generation part generates the second white data by adding the white correction data to the first white data.

24. An apparatus for driving a liquid crystal display (LCD) device comprising:

a liquid crystal panel including 4-color sub-pixels;

a data driver configured to provide video data signals to each sub-pixel;

a gate driver configured to provide a scan pulse to each sub-pixel;

a data converter configured to detect an Average Picture Level (APL) of 3-color source data and a ratio of an achromatic color signal to a chromatic color signal, to generate a gain value corresponding to the APL and the ratio, and to convert the 3-color source data into 4-color data using the generated gain value; and a timing controller communicating the 4-color data received through the data converter to the data driver, and to control the gate driver and the data driver.

25. The apparatus as in claim 24, wherein the data converter comprises:

a reverse gamma correction part to reverse gamma correct the 3-color source data so as to generate 3-color input data;

a gain value generation part to generate a gain value according to the APL of the 3-color input data and the ratio of an achromatic color signal to a chromatic color signal;

a multiplication part to multiply the 3-color input data by the gain value so as to generate 3-color amplification data;

a first 4-color data generation part to abstract first white data from a common component of the 3-color amplification data, and to generate first 3-color output data using the first white data; and a gamma correction part to gamma correct the first white data and the first 3-color output data so as to generate the 4-color data.

26. The apparatus as in claim 25, wherein the gain value generation part comprises:

a first brightness signal generation part to generate a first brightness signal according to the ratio of an achromatic color signal to a chromatic color signal of the 3color input data;

a second brightness signal generation part to generate a second brightness signal according to the average picture level of the 3-color input data; and a gain value setting part to set the gain value according to the first brightness signal and the second brightness signal.

27. The apparatus as in claim 26, wherein the first brightness signal generation part comprises:

a brightness detection part to detect a maximum brightness value and a minimum brightness value of the 3color input data, and to output a value determined by multiplying the minimum brightness value by a value C, C being a positive real number;

a comparator to compare the C value-multiplied minimum brightness value with the maximum brightness value, and to output a first comparison result signal;

a first counter to counting the first comparison result signal in a unit frame, and to generate a first count signal; and a first brightness signal setting part to set the first brightness signal according to the first count signal.

28. The apparatus as in claim 27, wherein the first brightness signal setting part divides the first count signal by the number of pixels of the liquid crystal panel so as to set the first brightness signal.

29. The apparatus as in claim 26, wherein the second brightness signal generation part comprises:

an average picture level detection part to detect the average picture level of the 3-color input data;

a comparator to compare the average picture level with a threshold value, and to output a second comparison result signal;

a second counter to count the second comparison result signal in a unit frame, and to generate a second count signal; and a second brightness signal setting part to set the second brightness signal according to the second count signal and an offset value.

30. The apparatus as in claim 29, wherein the threshold value is approximately 0.5 to approximately 0.6.

31. The apparatus as in claim 29, wherein the offset value is approximately 0.2 to approximately 0.3.

32. The apparatus as in claim 29, wherein the second brightness signal setting part divides the second count signal by the number of pixels of the liquid crystal panel, and sets the second brightness signal by adding the offset value to the division result value.

33. The apparatus as in claim 26, wherein, the gain value setting part produces an $\alpha$ value by multiplying the first brightness signal by the second brightness signal, and sets the gain value by adding unity to the $\alpha$ value.

34. The apparatus as in claim 24, wherein the data converter comprises:

a reverse gamma correction part to reverse gamma correct the 3-color source data so as to generate 3-color input data;

a gain value generation part to generate a gain value according to the average picture level of the 3-color input data and the ratio of an achromatic color signal to a chromatic color signal;

a multiplication part to multiply the 3-color input data by the gain value so as to generate 3-color amplification data;

a first 4-color data generation part to abstract first white data from a common component of the 3-color amplification data, and to generate first 3-color output data using the first white data;

a second 4-color data generation part correct the first white data and the first 3-color output data, and to generate second white data and second 3-color output data; and a gamma correction part to gamma correct the second white data and the second 3-color output data so as to generate the 4-color data.

35. The apparatus as in claim 34, wherein the gain value generation part comprises:

a first brightness signal generation part to generate a first brightness signal according to the ratio of an achromatic color signal to a chromatic color signal of the 3color input data;

a second brightness signal generation part to generate a second brightness signal according to the average picture level of the 3-color input data; and a gain value setting part to set the gain value according to the first brightness signal and the second brightness signal.

36. The apparatus as in claim 35, wherein the first brightness signal generation part comprises:

a brightness detection part to detect a maximum brightness value and a minimum brightness value of the 3color input data, and to output a value determined by multiplying the minimum brightness value by a C value, the C value being a positive real number;

a comparator to compare the C value-multiplied minimum brightness value with the maximum brightness value, and to output a first comparison result signal;

a first counter to count the first comparison result signal in a unit frame, and to generate a first count signal; and a first brightness signal setting part to set the first brightness signal according to the first count signal.

37. The apparatus as in claim 36, wherein the first brightness signal setting part divides the first count signal by the number of pixels of the liquid crystal panel so as to set the first brightness signal.

38. The apparatus as in claim 35, wherein the second brightness signal generation part comprises:

an average picture level detection part to detect the average picture level of the 3-color input data;

a comparator to compare the average picture level with a threshold value, and to output a second comparison result signal;

a second counter to count the second comparison result signal in a unit frame, and to generate a second count signal; and a second brightness signal setting part to set the second brightness signal according to the second count signal and an offset value.

39. The apparatus as in claim 38, wherein the threshold value is approximately 0.5 to approximately 0.6.

40. The apparatus as in claim 38, wherein the offset value is approximately 0.2 to approximately 0.3.

41. The apparatus as in claim 38, wherein the second brightness signal setting part divides the second count signal by the number of pixels of the liquid crystal panel, and sets the second brightness signal by adding the offset value to the division result value.

42. The apparatus as in claim 35, wherein, the gain value setting part produces an $\alpha$ value by multiplying the first brightness signal by the second brightness signal, and sets the gain value by adding a unity to the $\alpha$ value.

43. A method for driving a liquid crystal display (LCD) device which comprises a liquid crystal panel including 4 sub-pixels, a data driver for providing video data signals to the sub-pixels, and a gate driver for providing a scan pulse to the sub-pixels, the method comprising:

detecting an Average Picture Level (APL) of 3-color source data, and generating a gain value corresponding to the average picture level;

converting the 3-color source data into 4-color data using the generated gain value; and converting the 4-color data into the video data, and providing video data to each sub-pixel in synchronization with the scan pulse.

44. The method as in claim 43, wherein the step of converting the 3-color source data into 4-color data comprises:

generating 3-color input data by reverse gamma correcting the 3-color source data;

generating the gain value according to the average picture level of the 3-color input data;

multiplying the 3-color input data by the gain value so as to generate 3-color amplification data;

abstracting first white data from a common component of the 3-color amplification data, and generating first 3-color output data using the first white data; and gamma correcting the first white data and the first 3-color output data so as to generate the 4-color data.

45. The method as in claim 44, wherein the step of setting the gain value comprises:

detecting the average picture level of the 3-color input data;

comparing the average picture level with a threshold value, and outputting a comparison result signal;

counting the comparison result signal in a unit frame, and generating a count signal; and setting the gain value according to the count signal and an offset value.

46. The method as in claim 45, wherein the threshold value is approximately 0.5 to approximately 0.6.

47. The method as in claim 45, wherein the offset value is approximately 0.2 to approximately 0.3.

48. The method as in claim 45, wherein the step of setting the gain value sets the gain value to a value approximately (1+offset) to a value approximately (1+$\alpha$), a value of a being a positive real number).

49. The method as in claim 48, wherein the step of setting the gain value comprises:

dividing the count signal by the number of pixels of the liquid crystal panel, and producing the $\alpha$ value by adding the offset value to the divided value; and setting the gain value by adding a unity to the $\alpha$ value.

50. The method as in claim 44, wherein the step of generating the first 3-color output data comprises subtracting the abstracted first white data from the 3-color amplification data.

51. The method as in claim 50, wherein the step of subtracting the first white data multiplies the abstracted first white data by a 3-color $\alpha$ value such that the abstracted first white data contributes to brightness of the first 3-color output data.

52. The method as in claim 43, wherein the step of converting the 3-color source data into 4-color data comprises:

generating 3-color input data by reverse gamma correcting the 3-color source data;

generating the gain value according to the average picture level of the 3-color input data;

multiplying the 3-color input data by the gain value so as to generate 3-color amplification data;

abstracting first white data from a common component of the 3-color amplification data, and generating first 3-color output data using the first white data;

generating second white data and second 3-color output data using the first white data and the first 3-color output data; and gamma-correcting the second white data and the second 3color output data so as to generate the 4-color data.

53. The method as in claim 52, wherein the step of setting the gain value comprises:

detecting the average picture level of the 3-color input data;

comparing the average picture level with a threshold value, and outputting a comparison result signal;

counting the comparison result signal in a unit frame, and generating a count signal; and setting the gain value according to the count signal and an offset value.

54. The method as in claim 52, wherein the threshold value is approximately 0.5 to approximately 0.6.

55. The method as in claim 52, wherein the offset value is approximately 0.2 to approximately 0.3.

56. The method as in claim 52, wherein the step of setting the gain value sets the gain value to approximately (1+offset) to approximately (1+$\alpha$), the value of $\alpha$ value being a positive real number.

57. The method as set forth in claim 56, wherein the step of setting the gain value comprises:

dividing the count signal by the number of pixels of the liquid crystal panel, and determining the $\alpha$ value by adding the offset value to the divided value; and setting the gain value by adding unity to the $\alpha$ value.

58. The method as in claim 52, wherein the step of generating the first 3-color output data comprises subtracting the abstracted first white data from the 3-color amplification data.

59. The method as in claim 58, wherein the step of subtracting the first white data multiplies the abstracted first white data by a 3-color $\alpha$ value such that the abstracted first white data contributes to brightness of the first 3-color output data.

60. The method as in claim 58, wherein the step of generating the second white data and the second 3-color output data comprises:

detecting a maximum brightness value of the first 3color output data;

detecting an error component using the maximum brightness value;

generating 3-color correction data using the first 3color output data and the error component;

generating white correction data using the 3-color correction data;

generating second 3-color output data using the first 3color output data and the 3-color correction data; and generating the second white data using the white correction data and the first white data.

61. The method as in claim 60, wherein the step of detecting the error component subtracts unity from the maximum brightness value.

62. The method as in claim 60, wherein the step of generating the 3-color correction data comprises:

dividing the first 3-color output data by the maximum brightness value to produce a division result value; and generating the 3-color correction data by multiplying the error component by the division result value.

63. The method as in claim 60, wherein the step of generating the white correction data comprises:

multiplying each characteristic parameter of the 3-color data by the 3-color correction data to produce a multiplication result value for each color; and generating the white correction data by adding the multiplication result values for each color to each other.

64. The method as in claim 60, wherein the second 3color data is generated by subtracting the 3-color correction data from the first 3-color output data.

65. The method as in claim 60, wherein the second white data is generated by adding the white correction data to the first white data.

66. A method for controlling a liquid crystal display (LCD) device which comprises a liquid crystal panel including 4 sub-pixels, a data driver for providing video data signals to each sub-pixels, and a gate driver for providing a scan pulse to each sub-pixels, the method comprising:

detecting an Average Picture Level (APL) of 3-color source data and a ratio of an achromatic color signal to a chromatic color signal, and generating a gain value corresponding to the average picture level;

converting the 3-color source data into 4-color data using the generated gain value; and converting the 4-color data into video data, and providing the video data to each sub-pixel in synchronization with the scan pulse.

67. The method as in claim 66, wherein the step of converting the 3-color source data into the 4-color data comprises:

generating 3-color input data by reverse gamma correcting the 3-color source data;

generating the gain value according to the average picture level of the 3-color input data;

generating 3-color amplification data by multiplying the 3-color input data by the gain value;

abstracting first white data from a common component of the 3-color amplification data, and generating first 3-color output data using the first white data; and generating the 4-color data by gamma correcting the first white data and the first 3-color output data.

68. The method as in claim 67, wherein the step of generating the gain value comprises:

generating a first brightness signal proportional to the ratio of the achromatic color signal and the chromatic color signal of the 3-color input data;

generating a second brightness signal according to the average picture level of the 3-color input data; and setting the gain value according to the first brightness signal and the second brightness signal.

69. The method as in claim 68, wherein the process of generating the first brightness signal comprises:

detecting a maximum brightness value and a minimum brightness value of the 3-color input data, and multiplying the minimum brightness value by a C value, the C value being a positive real number;

comparing the C value-multiplied minimum brightness value with the maximum brightness value, and outputting a first comparison result signal;

counting the first comparison result signal in a unit frame, and generating a first count signal; and setting the first brightness signal according to the first count signal.

70. The method as in claim 69, wherein the step of generating the first brightness signal sets the first brightness signal by dividing the first count signal by the number of pixels of the liquid crystal panel.

71. The method as in claim 68, wherein the step of generating the second brightness signal comprises:

detecting the average picture level of the 3-color input data;

comparing the average picture level with a threshold value, and outputting a second comparison result signal;

counting the second comparison result signal in a unit frame, and generating a second count signal; and setting the second brightness signal according to the second count signal and an offset value provided from outside.

72. The method as set forth in claim 71, wherein the threshold value is approximately 0.5 to approximately 0.6.

73. The method as set forth in claim 71, wherein the offset value is approximately 0.2 to approximately 0.3.

74. The method as in claim 71, wherein the step of setting the gain value sets the gain to approximately a value (1+offset) to approximately a value of (1+α), the α value being a positive real number.

75. The method as in claim 74, wherein the step of setting the gain value comprises:

dividing the count signal by the number of pixels of the liquid crystal panel, and producing the α value by adding the offset value to the divided value; and setting the gain value by adding unity to the α value.

76. The method as in claim 67, wherein the step of generating the first 3-color output data comprises the step of subtracting the abstracted first white data from the 3color amplification data.

77. The method as in claim 76, wherein the step of subtracting the first white data multiplies the abstracted first white data by a 3-color α value as such that the abstracted first white data contributes to brightness of the first 3-color output data.

78. The method as in claim 66, wherein the step of converting the 3-color source data into the 4-color data comprises:

generating 3-color input data by reverse gamma correcting the 3-color source data;

generating the gain value according to the average picture level of the 3-color input data;

generating 3-color amplification data by multiplying the 3-color input data by the gain value;

abstracting first white data from a common component of the 3-color amplification data, and generating first 3-color output data using the first white data;

generating second white data and second 3-color output data using the first white data and the first 3-color output data; and generating the 4-color data by gamma correcting the second white data and the second 3-color output data.

79. The method as in claim 78, wherein the step of generating the gain value comprises:

generating a first brightness signal as the ratio of the achromatic color signal and the chromatic color signal of the 3-color input data;

generating a second brightness signal according to the average picture level of the 3-color input data; and setting the gain value according to the first brightness signal and the second brightness signal.

80. The method as in claim 79, wherein the step of generating the first brightness signal comprises:

detecting a maximum brightness value and a minimum brightness value of the 3-color input data, and multiplying the minimum brightness value by a C value, the C value being a positive real number;

comparing the C value-multiplied minimum brightness value with the maximum brightness value, and outputting a first comparison result signal;

counting the first comparison result signal in a unit frame, and generating a first count signal; and setting the first brightness signal according to the first count signal.

81. The method as in claim 80, wherein the step of generating the first brightness signal sets the first brightness signal by dividing the first count signal by the number of pixels of the liquid crystal panel.

82. The method as in claim 79, wherein the step of generating the second brightness signal comprises:

detecting the average picture level of the 3-color input data;

comparing the average picture level with a threshold value, and outputting a second comparison result signal;

counting the second comparison result signal in a unit frame, and generating a second count signal; and setting the second brightness signal according to the second count signal and an offset value.

83. The method as set forth in claim 82, wherein the threshold value is approximately 0.5 to approximately 0.6.

84. The method as in claim 82, wherein the offset value is approximately 0.2 to approximately 0.3.

85. The method as in claim 82, wherein the step of setting the gain value sets the gain value to a value of approximately (1+offset) to a value of approximately (1+$\alpha$), the $\alpha$ value being a positive real number.

86. The method in claim 85, wherein the step of setting the gain value comprises:

dividing the count signal by the number of pixels of the liquid crystal panel, and producing the $\alpha$ value by adding the offset value to the divided value; and setting the gain value by adding unity to the $\alpha$ value.

87. The method as in claim 78, wherein the step of generating the first 3-color output data comprises the step of subtracting the abstracted first white data from the 3-color amplification data.

88. The method as in claim 87, wherein the step of subtracting the first white data multiplies the abstracted first white data by a 3-color $\alpha$ value as a such that the abstracted first white data contributes to brightness of the first 3-color output data.

89. The method as in claim 87, wherein the step of generating the second white data and the second 3-color output data comprises:

detecting a maximum brightness value of the first 3color output data;

detecting an error component using the maximum brightness value;

generating 3-color correction data using the first 3-color output data and the error component;

generating white correction data using the 3-color correction data;

generating the second 3-color output data using the first 3-color output data and the 3-color correction data; and generating the second white data using the white correction data and the first white data.

90. The method as in claim 89, wherein the step of detecting the error component detects the error component by subtracting unity from the maximum brightness value.

91. The method as in claim 89, wherein the step of generating the 3-color correction data comprises:

dividing the first 3-color output data by the maximum brightness value to produce a division result; and generating the 3-color correction data by multiplying the error component by the division result value.

92. The method as in claim 89, wherein the step of generating the white correction data comprises:

multiplying each characteristic parameter of the 3-color data by the 3-color correction data to produce a multiplication result; and generating the white correction data by adding the multiplication result values to each other.

93. The method as in claim 89, wherein the second 3color data is generated by subtracting the 3-color correction data from the first 3-color output data.

94. The method as in claim 89, wherein the second white data is generated by adding the white correction data to the first white data.

* * * * *